United States Patent [19]

Gat et al.

[11] Patent Number: 5,114,242
[45] Date of Patent: May 19, 1992

[54] BICHANNEL RADIATION DETECTION METHOD

[75] Inventors: Arnon Gat, Palo Alto; David Mordo, San Jose, both of Calif.

[73] Assignee: AG Processing Technologies, Inc., Sunnyvale, Calif.

[21] Appl. No.: 624,206

[22] Filed: Dec. 7, 1990

[51] Int. Cl.$^5$ ............................ G01J 5/62; G01J 5/60; G01J 5/54; G01J 5/10

[52] U.S. Cl. .................................. 374/128; 374/129; 374/126

[58] Field of Search ...................... 374/1, 9, 126, 127, 374/128, 129; 250/338.1; 356/45

[56] References Cited

U.S. PATENT DOCUMENTS

| 3,261,257 | 7/1966 | Pfister | 374/127 |
| 3,433,052 | 3/1969 | Maley | 274/129 |
| 3,448,283 | 6/1969 | Higley et al. | 250/226 |
| 3,537,314 | 11/1970 | Svet | 374/9 |
| 3,539,807 | 11/1970 | Bickel | 374/129 |

(List continued on next page.)

FOREIGN PATENT DOCUMENTS

| 242044 | 12/1962 | Australia . | |
| 0707105 | 4/1965 | Canada | 374/127 |
| 2339732 | 2/1975 | Fed. Rep. of Germany | 244/73 |
| 0144513 | 11/1980 | Japan | 374/9 |
| 0160029 | 10/1982 | Japan | 374/129 |
| 0052531 | 3/1983 | Japan | 374/127 |
| 0139037 | 8/1983 | Japan | 374/127 |
| 131430 | 7/1985 | Japan . | |
| 253939 | 12/1985 | Japan . | |
| 130834 | 6/1986 | Japan | 374/133 |
| 62-50627 | 3/1987 | Japan . | |
| 763698 | 12/1977 | U.S.S.R. . | |
| 1418579 | 8/1988 | U.S.S.R. | 374/129 |
| 1212685 | 11/1970 | United Kingdom . | |
| 2045425 | 10/1980 | United Kingdom . | |
| 2082767 | 3/1982 | United Kingdom | 374/128 |

OTHER PUBLICATIONS

"Temperature Measurement Validity for Dual Spectral-Band Radiometric Techniques" by Fehribach/Johnson: Optical Engineering (Dec. 1989).

"On the Validity and Techniques of Temperature and Emissivity Measurements", by Fehribach, Johnson and Feng: University of Alabama in Huntsville (1988).
"Dual-Wavelength Radiation Thermometry: Emissivity Compensation Algorithms", by Tsai, Shoemaker, et al.; International Journal of Thermophysics (May 1989).
Summary of Splinter Workshop on "Materials Thermal & Thermoradiative Properties/Characterization Technology", by DeWitt/Ho; JPL Publication 89-16 (Jun. 1989).
"Industrial Radiation Thermometry", by Albert S. Tenney; Mechanical Engineering, (Oct. 1988).
"Advances in Dual-Wavelength Radiometry", by W. R. Barron, Sensors (Jan. 1990).

Primary Examiner—William A. Cuchlinski, Jr.
Assistant Examiner—Diego F. F. Gutierrez
Attorney, Agent, or Firm—A. C. Smith

[57] ABSTRACT

The system and method for pyrometrically determining the temperature of a semiconductor wafer within a processing chamber accurately determines the actual emissivity of the semiconductor wafer at a reference temperature using multiple pyrometers operating at different wavelengths. The pyrometers are calibrated for radiation received from the processing chamber and their responses are then corrected to provide the proper temperature indication for a master wafer at a known reference temperature to yield emissivity of the master wafer. Other similar wafers exhibiting extreme values of emissivity are sensed at the reference temperature to provide pyrometer responses that are corrected in accordance with the master emissivity, and such corrected responses are used to establish a correlation between emissivities and the corrected pyrometer responses. The corrected pyrometer responses on other wafers operating near the reference temperature can then be used with the emissivities to determine the true temperature of each such other wafer. The processing temperature of the wafer is then determined and controlled in accordance with the actual emissivity of the wafer for more precise thermal processing.

9 Claims, 7 Drawing Sheets

U.S. PATENT DOCUMENTS

| | | | |
|---|---|---|---|
| 3,611,805 | 10/1971 | Hishikari | 374/127 |
| 3,641,345 | 2/1972 | Coackley | 374/127 |
| 3,715,922 | 2/1973 | Menge | 374/127 |
| 3,735,136 | 5/1973 | Flint | 250/83 |
| 3,759,102 | 9/1973 | Murray | 73/355 |
| 3,806,249 | 4/1974 | Lesinski | 374/127 |
| 3,849,000 | 11/1974 | Soardo et al. | 374/127 |
| 3,922,550 | 11/1975 | Crowley et al. | 374/9 |
| 4,144,758 | 3/1979 | Roney | 374/129 |
| 4,222,663 | 9/1980 | Gebhart et al. | 356/45 |
| 4,227,369 | 10/1980 | Williams | 60/734 |
| 4,432,657 | 2/1984 | Rudzki et al. | 374/126 |
| 4,561,786 | 12/1985 | Anderson | 374/129 |
| 4,579,461 | 4/1986 | Rudolph | 374/126 |
| 4,611,930 | 9/1986 | Stein | 374/126 |
| 4,659,234 | 4/1987 | Brouwer et al. | 374/127 |
| 4,708,493 | 11/1987 | Stein | 374/126 |
| 4,722,612 | 2/1988 | Junkert et al. | 374/124 |
| 4,729,668 | 3/1988 | Angel et al. | 374/127 |
| 4,764,025 | 8/1988 | Jensen | 374/144 |
| 4,764,026 | 8/1988 | Powell et al. | 374/178 |
| 4,817,020 | 3/1989 | Chande et al. | 374/127 |
| 4,854,727 | 8/1989 | Pecot et al. | 374/1 |
| 4,881,823 | 11/1989 | Tanaka et al. | 374/128 |
| 4,969,748 | 11/1990 | Crowley et al. | 374/126 |
| 4,984,902 | 1/1991 | Crowley et al. | 374/126 |

BICHANNEL RADIATION DETECTION METHOD

RELATED APPLICATIONS

The subject matter of this application relates to the subject matter disclosed in U.S. Pat. Nos. 5,061,084, 4,919,542 and 4,854,727, and to the subject matter disclosed in the pending application for U.S. patent Ser. No. 07/624,205 entitled "Bichannel Radiation Detection Apparatus" filed on eve date herewith by Arnon Gat and Michael French, all of which subject matter is incorporated herein by this reference.

BACKGROUND OF INVENTION

Accurately measuring the elevated temperature of a remote object in cold wall non-equilibrium furnaces, using optical techniques and without touching the object is complicated because of undesired reflections of ambient radiation from the heat source along with the desired radiation from the heated object itself. Optical pyrometry allows the temperature of an object to be measured remotely by analyzing the radiation emitted by the object. Of course, all objects at temperatures greater than zero Kelvin emit radiation which can be measured to determine the temperature of the object, provided the emissivity of the object is known. Thus, optical pyrometry operates upon the underlying principle that as the temperature of an object increases, the radiation it emits shifts in wavelength and increases in intensity so that an object which emits radiation with an orange glow is hotter than an otherwise identical object which emits radiation with a red glow. Such temperature-measuring schemes are discussed in the literature (see, for example, Tenney; *Mechanical Engineering*, Oct. 1986; "Red Hot . . . AND HOTTER, " pp. 36–41).

Certain processes for fabricating circuits on silicon wafers require accurate measurement from a remote location of the temperature of a wafer within a processing furnace. This measurement is complicated because in almost all cases the wafer emissivity is unknown. The emissivity of the wafer is altered by different treatments to its backside surface or by additional back side coatings on the wafer of different thicknesses and different materials such as silicon dioxide or silicon nitride, polysilicon or metals. Optical temperature measurements of the wafer must therefore be corrected for emissivity of the wafer to provide accurate temperature measurements of the wafer. Since the radiation emitted from the wafer and sensed by the detector depends both on its temperature and its emissivity, a single measurement at one specific wavelength is insufficient to determine wafer temperature unless its emissivity is known. For a single-wavelength pyrometer to be useful, wafer emissivity is first measured, for example, by apparatus of the type disclosed in U.S. Pat. No. 4,854,727 entitled "Emissivity Calibration Apparatus and Method." Once emissivity is known, it can be used to determine wafer temperature from a single wavelength pyrometer measurement. However, since the determination of emissivity using a thermocouple reference is, in most cases, a destructive and lengthy process, it cannot be used on production wafers which are to be heat treated. One scheme used in such limiting cases is to measure the emissivity of one typical wafer from a batch, designated as the Master Wafer. Assuming that emissivities of the remaining wafers in the batch are close or identical to the emissivity of the Master Wafer, then this value of emissivity can be used to translate single wavelength pyrometer reading to true temperature of the wafer.

However, in many cases, the emissivities of wafers within a specific batch vary widely, and use of a single emissivity value for the entire batch of wafers will cause significant variations in measured wafer temperatures with potentially detrimental consequences in the processing of the wafers. The accuracy of conventional methods for optically measuring wafer temperatures is usually not adequate for temperature-controlling applications. Thus, it would be desirable to perform non-destructive, non-contacting and fast measurements on each wafer to concurrently determine its emissivity and temperature to necessary accuracies for acceptable batch process control in order to obviate the effects of reasonable changes in emissivity from wafer to wafer within a batch.

Wafer radiation may be conventionally measured in two or more wavebands to supply enough information from which to determine wafer emissivity and temperature. However, these measurement techniques generally rely on the fact that the effective emissivity of a wafer, or other object, is identical in each of the two or more measurement wavebands. On the assumption that the effective emissivity values are the same in different wavebands, they can be cancelled out in the determination of temperature by calculating a ratio of optical measurements. However, this assumption is not accurate or realistic for semiconductor wafers with diverse coatings on the back sides (from which the radiation is measured). In most cases, the emissivity of a semiconductor wafer is a function of both wavelength and temperature and therefore the above assumption in the prior art techniques contribute to erroneous temperature determinations by pyrometric measurement techniques.

SUMMARY OF INVENTION

The present invention utilizes multiple-wavelength optical pyrometry techniques to measure temperature of remote heated objects, such as semiconductor wafers, with varying emissivities in the presence of ambient radiation within a processing chamber. More specifically, the present invention accurately determines the temperature of a semiconductor wafer including diverse surface coatings through the use of multi-wavelength pyrometry. In accordance with the illustrated embodiment of the present invention, a pyrometer detector measures radiation from the hot wafer within the processing chamber. The true temperature of the wafer is determined by measuring the radiation emitted by the wafer in two or more wavebands, and by using a correlation function between the wafer emissivity on one channel, and other relations between the two or more channels. The width of the wavebands may be adjusted to optimize signal-to-noise ratio and temperature-measurement accuracy, with minimum widths approaching vanishingly small dimensions. Specifically, an uncoated silicon wafer with an embedded thermocouple is used to calibrate all pyrometer channels so that the processed outputs yield identical values of wafer temperatures on all channels. This essentially eliminates the dependency of the pyrometer signals on black-body radiation characteristics and linearizes the output indication using arbitrary constants. Then, a sample wafer selected from a batch is characterized as a Master Wafer from a set of Master Emissivities are determined on all channels at a selected temperature in order to "calibrate" the batch in rough, approximate terms. A subset of a limited few wafers of the batch are identified as representative of extreme cases of emissivity values, and these values together with the Master Emissivity values are utilized with pyrometer signals from the master wafer and the subset wafers to develop therefrom one or more correlation functions between wafer emissivity and pyrometer signals. Thereafter, the entire batch of wafers can be processed and pyrometer measurements on all channels can be taken at a predetermined temperature. A correlation function is then used to calculate and then adjust the emissivity of each specific wafer, and the true temperature of the wafer can then be determined for precise thermal processing.

DESCRIPTION OF THE PREFERRED EMBODIMENTS

Figure 1:
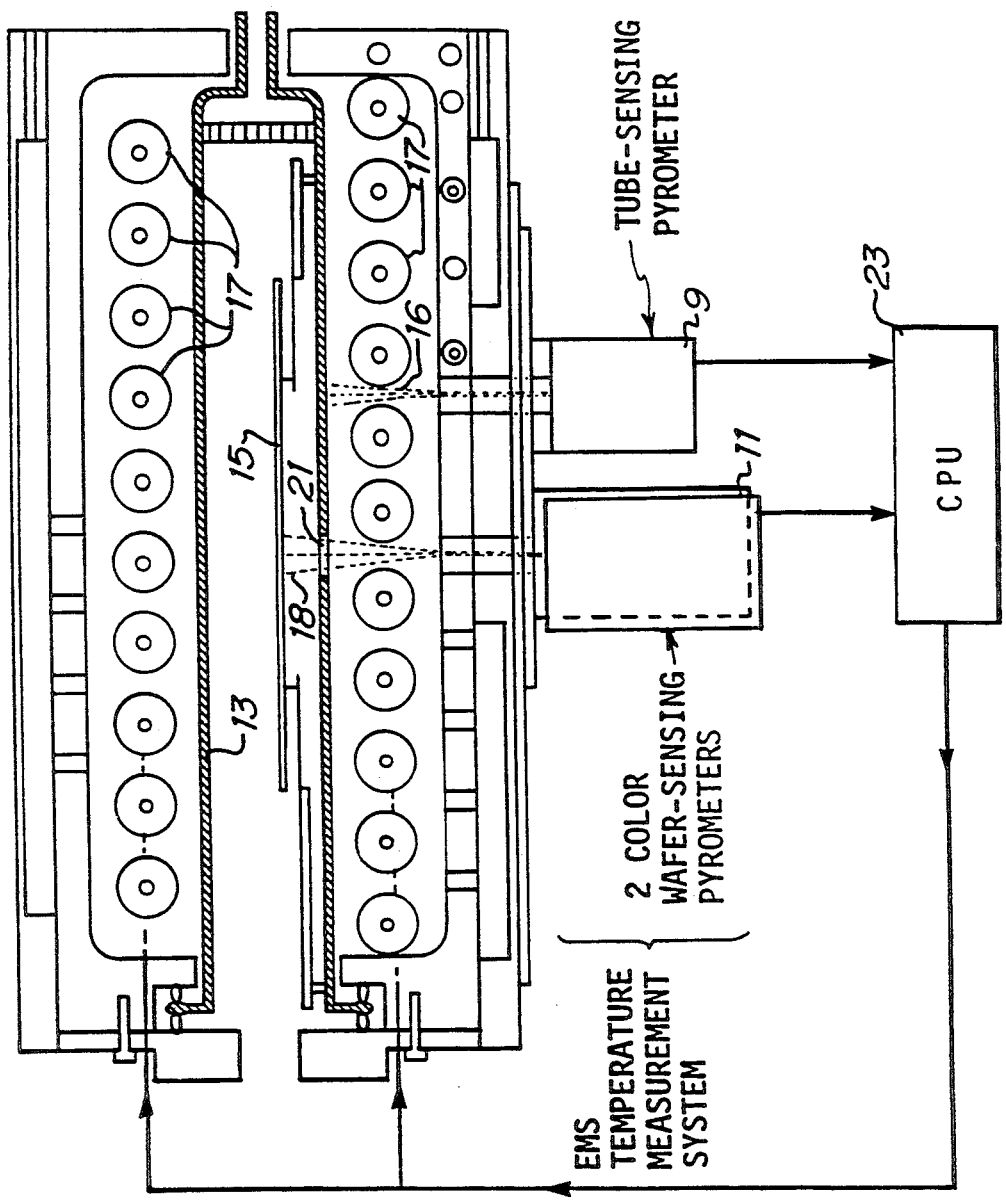
FIG. 1 is a pictorial sectional view of a thermal processing system illustrating the pyrometer configuration.

Referring now to FIG. 1, there is shown a pictorial sectional view of a thermal processing system including a single-waveband pyrometer 9 oriented to sense radiation from the exterior wall of the quartz processing chamber 13, where the operating waveband is selected within the opaque region of the spectral properties of quartz. A two-color or two waveband pyrometer 11 is oriented to sense radiation from the bottom or back side of semiconductor wafer 15 within the processing chamber 13. Conventional non-coherent light sources 17 such as gas-discharge or tungsten filament lamps are arranged in banks about wafer 15 for rapidly elevating the temperature of wafer 15 in known manner. One pyrometer 9 is disposed with a field of view 16 that excludes the lamps 17 and includes the quartz chamber 13. The other pyrometer 11 is disposed with a field of view 18 that substantially excludes the lamps 17 and the quartz chamber (through a view port 21 therein which has different radiation transmission characteristics than the walls of the processing chamber 13 (i.e., is effectively transparent at measurement wavelengths)) and includes the bottom or back side of wafer 15. Output signals produced by the pyrometers 9 and 11 in conventional manner in response to radiation received thereby within the respective fields of view thereof are supplied to a central processing unit 23 for determination of emissivity and true temperature of wafer 15 in accordance with the present invention in order to control the power supplied to the lamps 17 that radiantly heat the wafer 15. Of course, more than two pyrometers, each operating at different wavelengths, may also be used.

Figure 2:
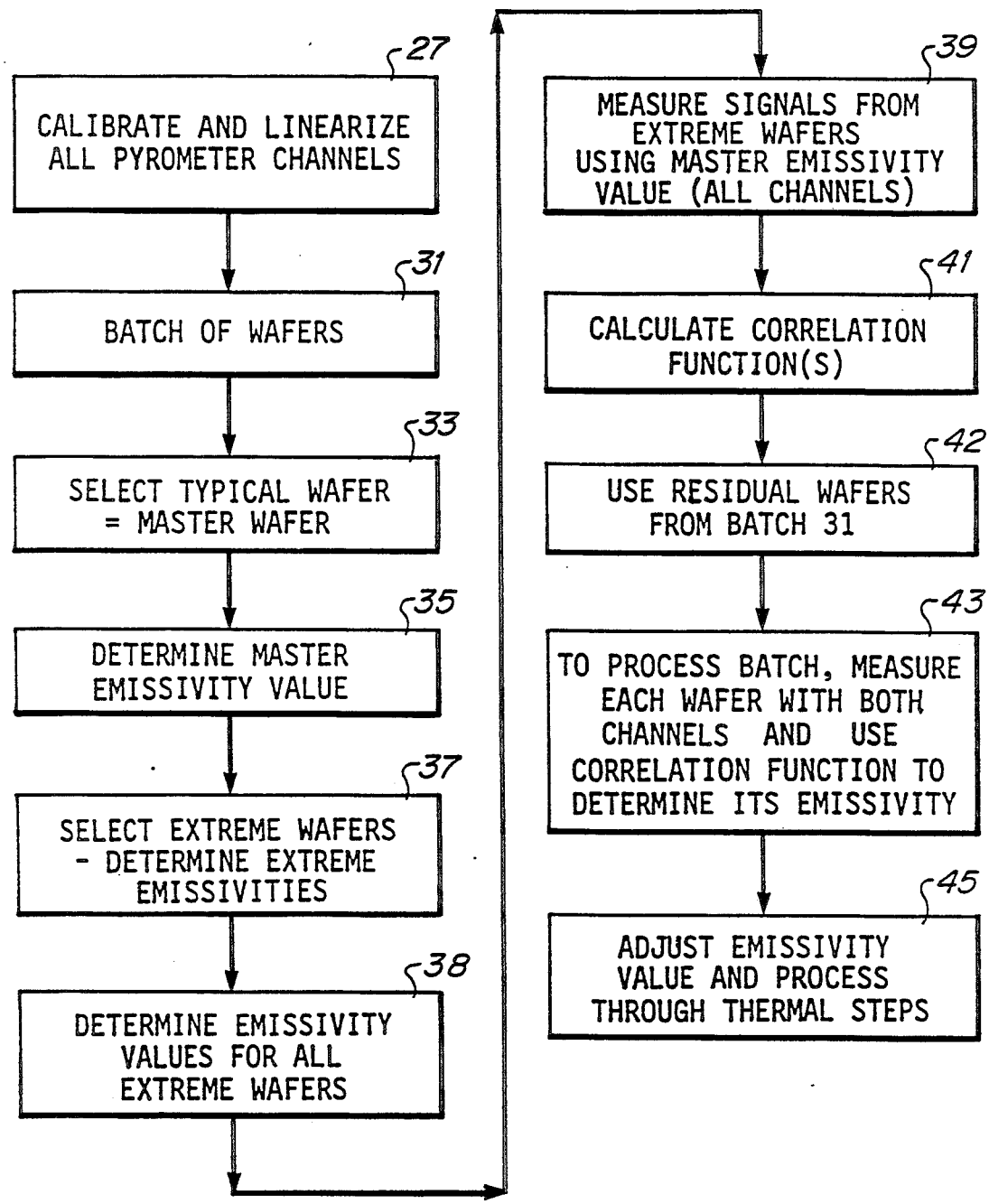
FIG. 2 is a flow chart illustrating the processing of the present invention.

Referring now to the flow chart of FIG. 2, a batch 31 of substantially similar semiconductor wafers are to be processed, for example, in a system as illustrated and described with reference to FIG. 1. In the initial step 27, the two-color pyrometer 11 has two different operating wavebands or channels, typically centered at or about 3.4 to 3.9 and 4.5 to 4.6 microns, and a common field of view (through the viewport 21) of the bottom or back side of wafer 15. The channels of the pyrometer are calibrated by elevating the temperature of a bare wafer (not selected from the batch 31) or other calibrating object of known radiative characteristics to a reference temperature of, say, 1000° C., and by multiplying the output of each pyrometer channel by a constant in order to yield outputs of common level that are indicative of the reference temperature and that incorporate a known or assumed emissivity of the bare wafer. Such constants may be selected, for example, to produce output signals of, say, 1,000 millivolts for a true temperature of 1000° C. This process may be repeated at a few reference values over a range of about 400–1200° C. so that the channels of the pyrometer can be calibrated over the whole range. This forms a correction table of values that can be used to eliminate the dependency upon the non-linear radiative characteristics of a black-body type radiator, and thereby generate a nominally linear (or other) relationship between the pyrometer output and the radiant flux input. The pyrometer 9 which views the exterior wall of the quartz chamber 13 may also be calibrated in similar manner against the known temperature of the quartz chamber (for example, as determined by a thermocouple in contact with the quartz chamber) to yield an output representative of the temperature of the quartz chamber. This corrected output from pyrometer 9 may thereafter be used to correct the outputs from pyrometer 11 in known manner (such as, but not limited to, subtraction of a percentage) to account for the portion of radiation sensed thereby attributable to the quartz chamber 13. Thus, the pyrometers 9 and 11 are calibrated to yield corrected outputs at known reference temperatures.

Then, a typical semiconductor wafer 33 may be randomly selected from the batch 31 of wafers that are to be thermally processed within the chamber 13. The selected wafer is designated as a Master Wafer and is statistically likely to have similar surface roughness, surface coatings, and the like, and therefore similar emissivity as the remaining wafers in the population of wafers that constitute the batch 31.

In step 35, the emissivity of the Master Wafer is determined by elevating the temperature thereof within the quartz chamber 13 to the reference temperature of, say, 1000° C. to provide outputs from the two channels of pyrometer 11 that are now indicative of the effective emissivity (called the Master Emissivities) of the Master Wafer. This roughly calibrates the emissivity of the entire batch 31 of wafers more accurately than as previously accomplished in calibrating the pyrometer 11 on a bare silicon wafer, as previously described in step 27.

Then, several wafers from this batch 31 may be tested seriatim 37 within the quartz chamber 13 by elevating the temperature of each wafer to the reference temperature and by measuring their emissivities in the same way as performed on the Master Wafer. The emissivity values may be determined 38 in similar manner for all extreme wafers where such extreme wafers may be selected from a run of all wafers, or may be previously formed with emissivities that are above and below nominal values. Then, emissivity settings on the two pyrometer channels are set to the values for the Master Wafer, and extreme wafers are again brought to a reference temperature, say 1000° C., but this time using the signal from one of the pyrometer channels to control the temperature. The output of the other pyrometer channel (i.e., the non-controlling channel) is recorded for each of the extreme wafers (in step 39). Where more than two pyrometers are used, their outputs may be processed in accordance with a logical combination of the outputs, such as averaging the outputs, averaging the differences between one and each other of the channels, and the like.

Figure 3:
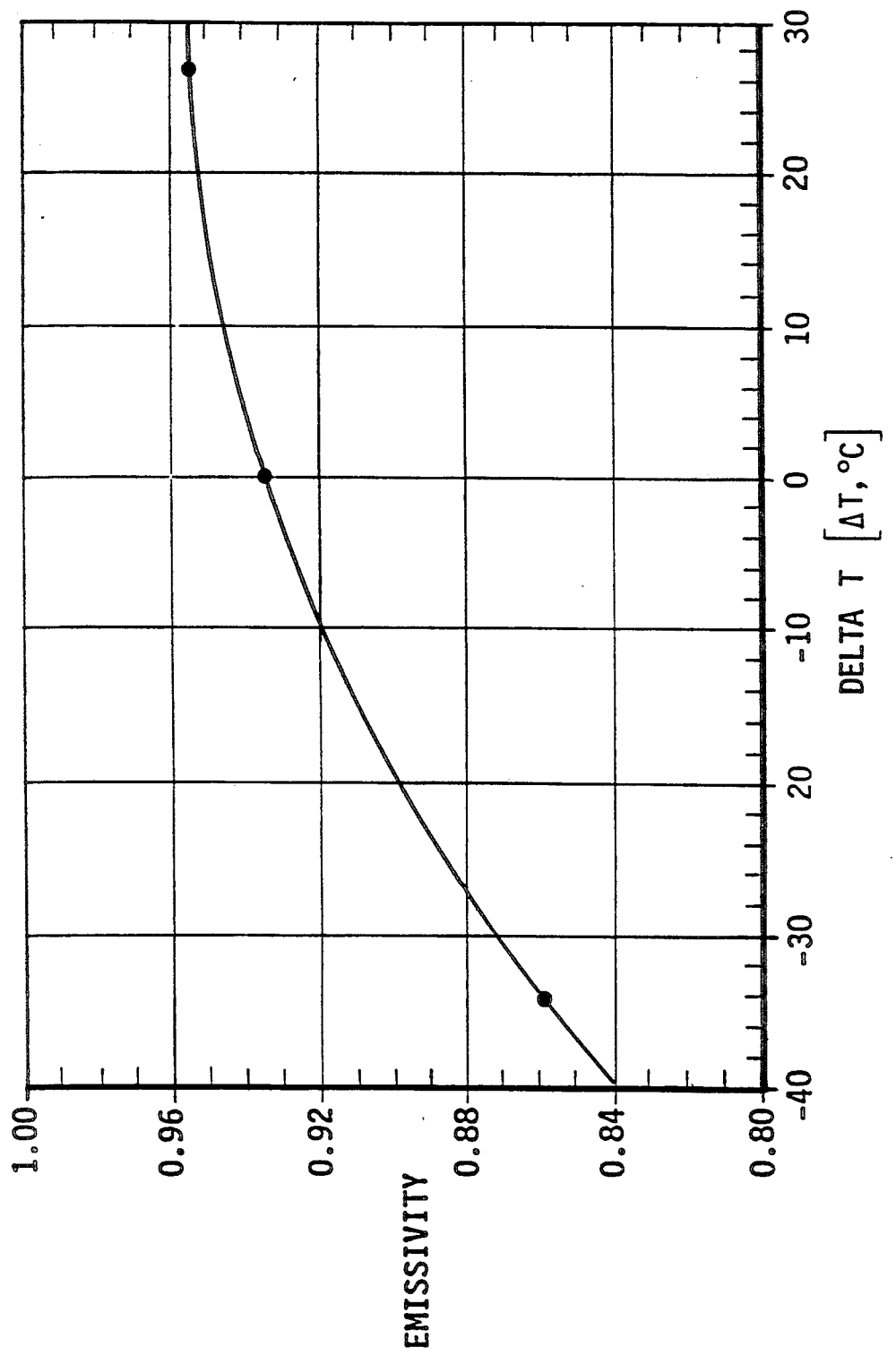
FIG. 3 is a graph illustrating a curve of emissivity according to one channel as a function of differential temperature signals from a pair of channels for a group of wafers with varying back side emissivities determined according to the present invention.

Based on the data acquired in the manner discussed above for extreme wafers, an empirical correlation curve may be constructed 41. Such correlation curve can have a linear, parabolic or any other polynomial curve that correlates the emissivity of the extreme wafers according to the controlling pyrometer channel to some combination of the output of both pyrometer channels when emissivities are set to the Master Emissivity on both pyrometers channels. In one embodiment, a correlation function for emissivity measured by one channel may be formed as a percentage of signal from one channel, less a percentage of signal from another channel. The graph of FIG. 3 indicates the emissivity measured by one pyrometer channel as a function of the difference of signals (designated $\Delta T$) measured by the two channels on wafers with bottom or back side oxide layers of various thicknesses. The solid line represents an implementation by a simple three parameter parabolic equation. Also, a correlation function for emissivity measured by one channel may be formed as the quotient of signal from the other channel divided by signal from the one channel. Of course, other more complex correlation functions for emissivity may be produced from logical combinations of signals from two or more pyrometers or channels operating at different wavelengths to yield outputs from all pyrometers that are indicative of the emissivity of the tested wafers at the reference temperature. In general, polynomial curves may be in the form:

$$Emissivity_{channel_1} = A_0 + A_1 \Delta T + A_2 \Delta T^2;$$

and $$Emissivity_{channel_2} = B_0 + B_1 \Delta T + B_2 \Delta T^2;$$

where $$\Delta T = channel_1 - channel_2.$$

Of course, the correlation function is not limited to a second-order equation but may be of higher order and complexity for greater precision. The correlation function(s) thus formed may then be used to process 43 the batch of wafers 31 to obtain the actual emissivity for each wafer and therefore accurately determine and control the actual temperature 45 of each wafer by pyrometric measurement. Additional batches of similar wafers may be processed at temperatures controlled in similar manner with the calibrated emissivities unchanged.

Specifically, a wafer from batch 31 that is to be processed is positioned in chamber 13 and is heated to the known reference temperature. The outputs from the pyrometer 11 are processed in accordance with the correlation functions determined in step 41 to yield the actual emissivity of the particular wafer. Thereafter, with the emissivity of the wafer known, the temperature of the wafer may now be accurately measured (and controlled) based upon the outputs of the pyrometer 11. In addition, the remaining wafers of the batch 31 may also be processed 42.

Figure 4:
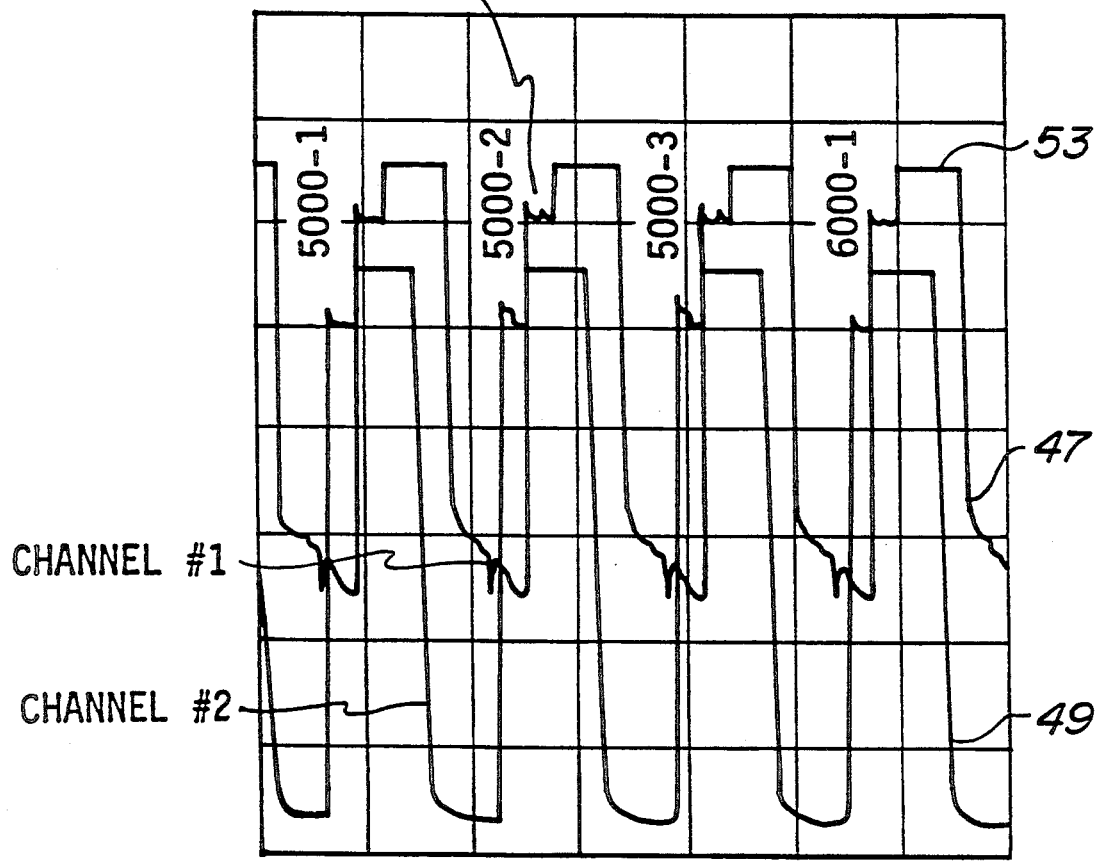
FIG. 4 is a graph illustrating pyrometer signals in the operation of the system of FIG. 1.

Referring now to FIG. 4, there is shown a graph of temperature with time over the intervals involved in successively processing several wafers of the batch 31. Signals 47, 49 from separate pyrometers or channels are shown displaced vertically in the graph for clarity, and each signal 47, 49 illustrates the cyclic thermal processing associated with each wafer. Specifically, each wafer is rapidly heated within the chamber 13 by the lamps 17 approximately to the reference temperature of, say, 1000° C. as determined approximately from the levels of output signals from one or more channels of the pyrometer 11. The signal levels from the pyrometer 11 are also recorded at the (approximate) reference temperature, and at a selected moment 51, the central processor 23 processes the signal levels from the pyrometer 11 in accordance with the correlation functions previously calculated 41 to yield the actual emissivity of the particular wafer. Then, the actual emissivity is substituted and this causes an abrupt change in the pyrometer signals 51. Thereafter, however, the signal from the controlling channel precisely represents the wafer temperature.

Also, the temperature of the wafer may then be elevated and accurately controlled at the higher processing temperature 53 (near the reference temperature) by controlling the power supplied to the lamps 17.

Figure 5:
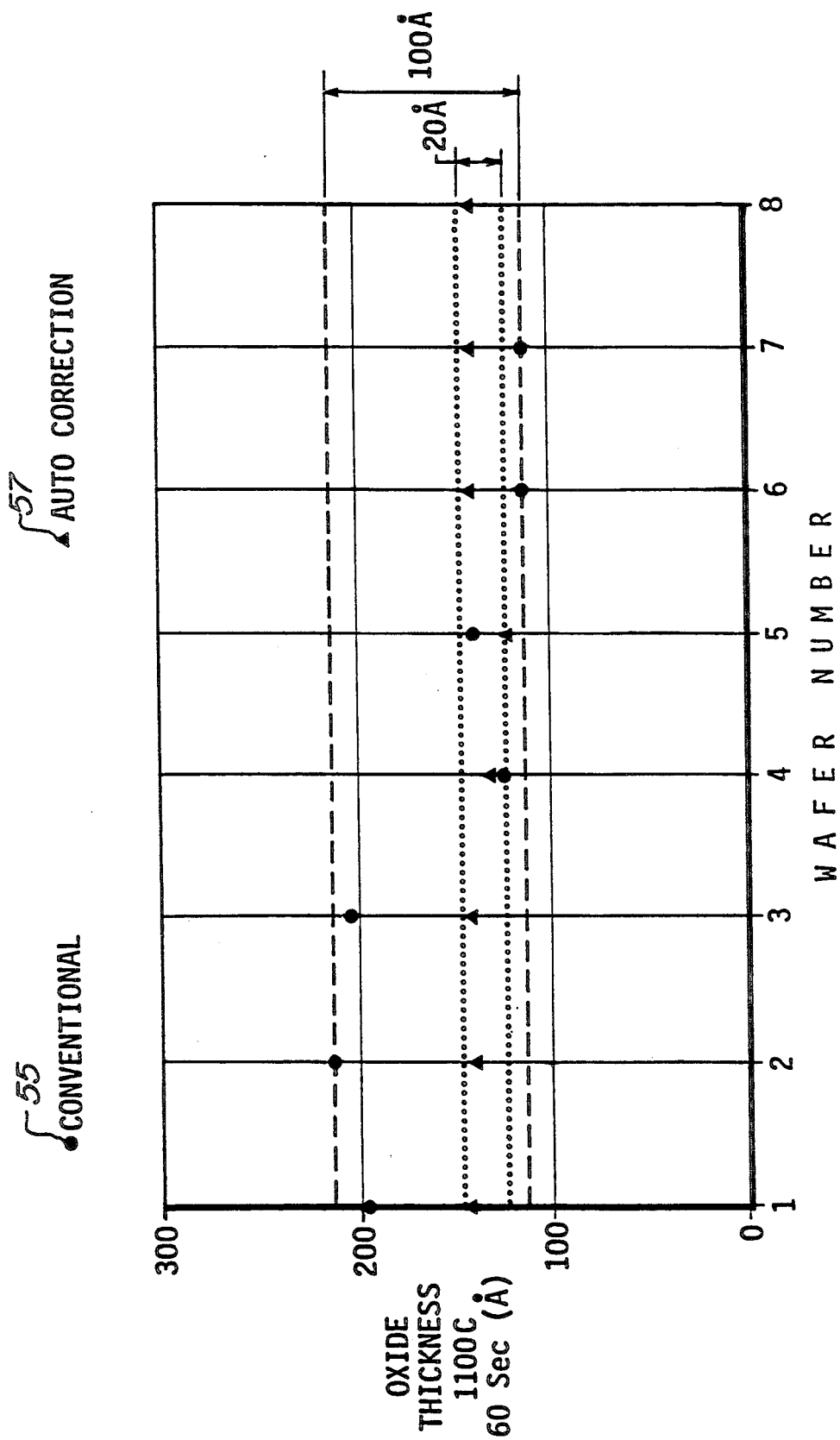
FIG. 5 is a graph illustrating oxidation processing results according to the present invention compared with results according to conventional processing.

Referring to the graph of FIG. 5, there is shown a family of points, illustrating the thickness of oxide layers formed using a 60-second oxidation cycle at 1100° C. on individual wafers within chamber 13 without automatic emissivity adjustment, and with automatic emissivity adjustment according to the present invention. The wafers have various back side emissivities. Specifically, the graph 55 illustrates oxide thicknesses formed on wafers of a batch at elevated temperature that is controlled in conventional manner (e.g. on the assumption that emissivities are constant), and thus at approximately the desired processing temperature. The graph 57 illustrates oxide thicknesses formed on the wafers of the batch at the desired processing temperature as detected and controlled according to the present invention in the manner as previously described. It should be noted from these graphs that processing under conventional temperature control contributes to variations in oxide thickness over the range from about 120 Angstroms to about 210 Angstroms, and that such variations in oxide thickness are reduced to within the range from about 130 Angstroms to about 150 Angstroms using temperature sensing and control according to the present invention. Control of oxide thickness to within approximately $\pm 10$ Angstroms in accordance with temperature control according to the present invention may be adequate for certain semiconductor processes, although control of oxide thicknesses to within approximately $\pm 5$ Angstroms is possible in a production environment operating under temperature control according to the present invention.

Figure 6:
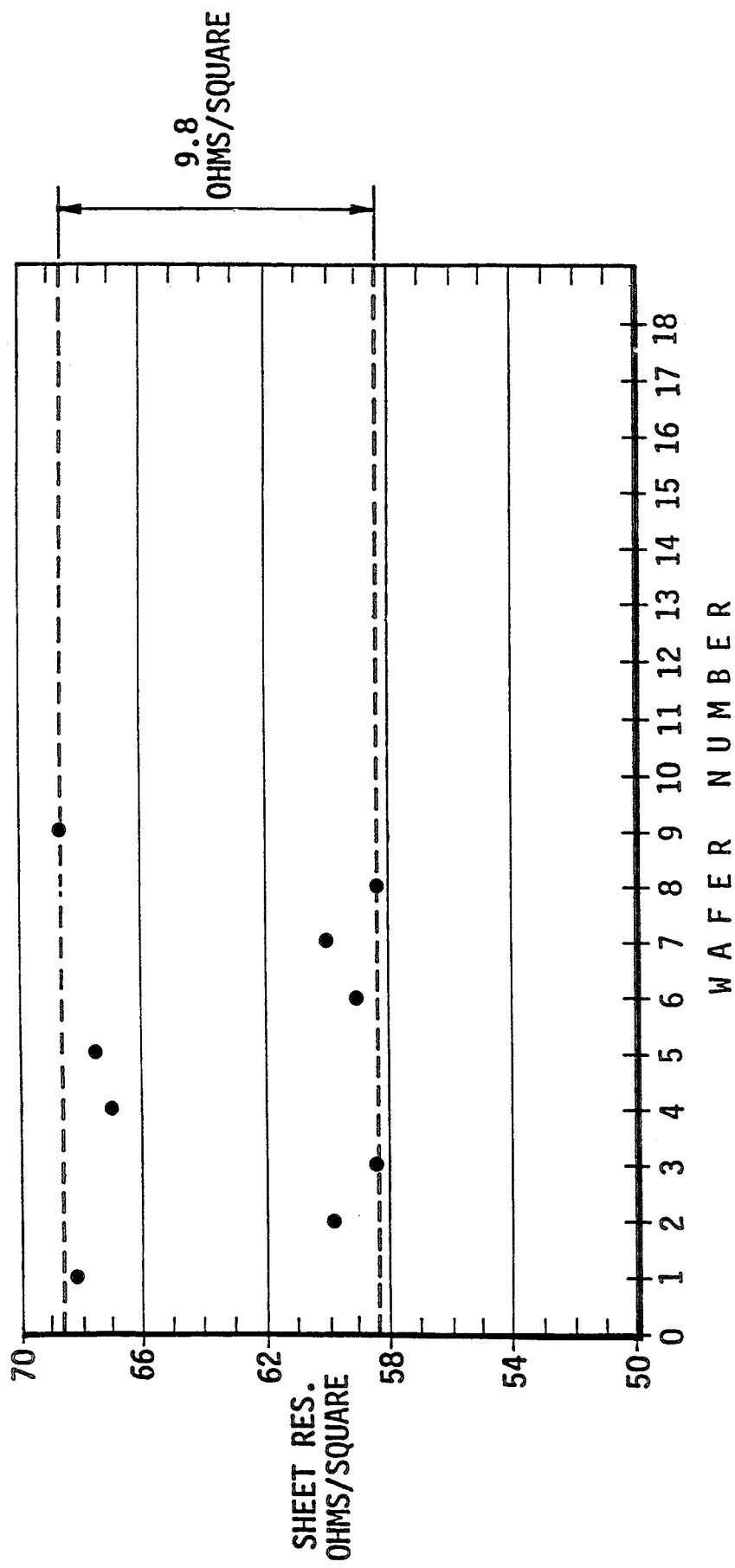
FIGS. 6 and 7 are graphs illustrating implant annealing results without and with the method of the present invention, respectively.
Figure 7:
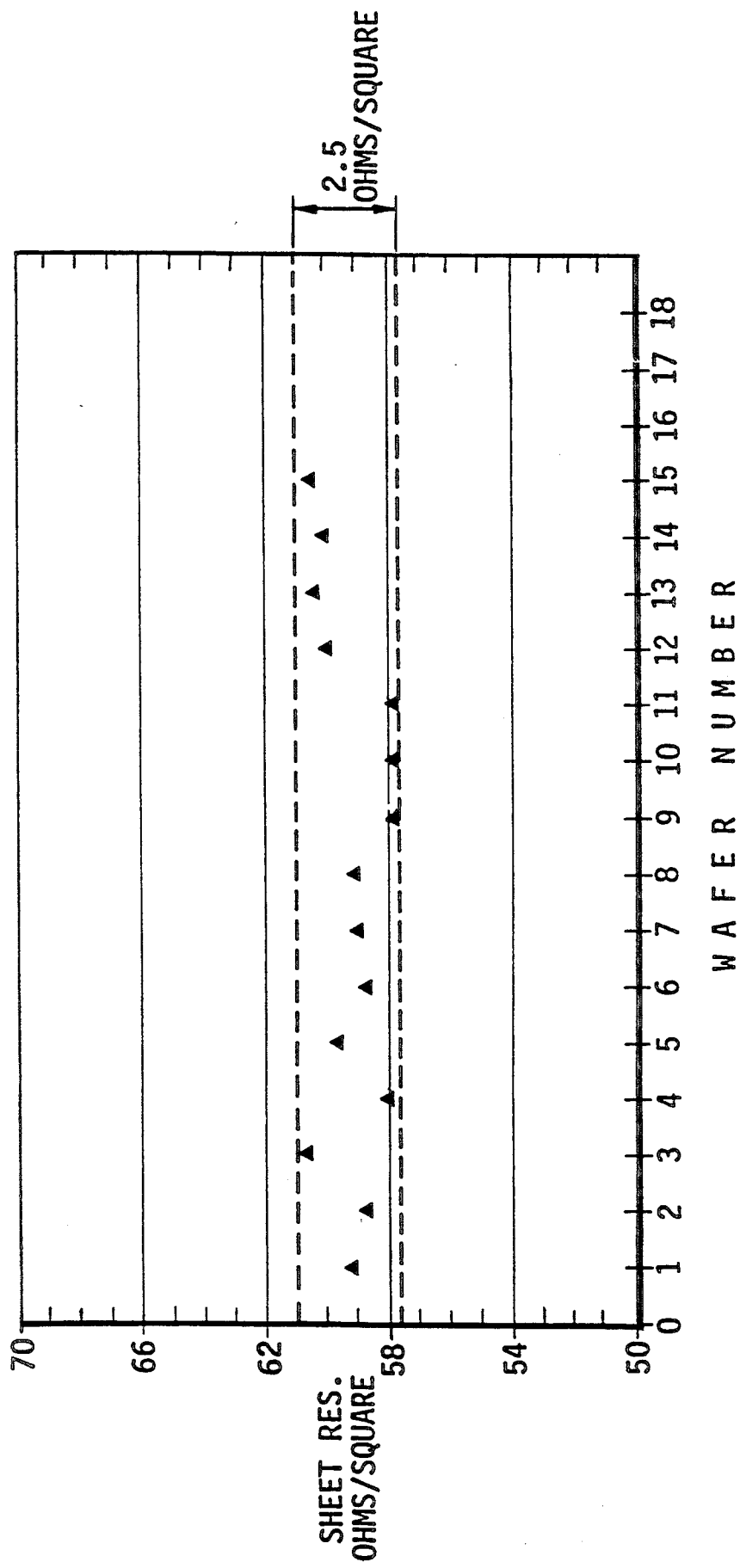

Similarly, as illustrated in the graphs of FIGS. 6 and 7, there are shown ranges of variation in sheet resistance of wafers that were annealed, respectively, without and with corrected temperature control according to the present invention after implant of about $4 \times 10^{15}$ atoms of arsenic per square centimeter at 50 KeV and anneal at 1050° C. for 20 seconds.

Therefore, the system and method of the present invention accurately determines the emissivity of a semiconductor wafer at elevated temperatures, and facilitates accurate pyrometric determination of the temperature of the wafer within the processing chamber for more accurately controlled thermal processing such as the formation of oxide layers on the wafers.

We claim:

1. A method for accurately determining in non-destructive, non-contacting manner the temperature within a processing chamber of an object that is selected from a population of similar objects using a plurality of pyrometers that operate in different wavebands on the radiation received through a wall of the processing chamber from an object within the chamber, the method comprising the steps of:

substantially calibrating the responses of each pyrometer on a reference object within the chamber to yield corrected responses at at least one reference temperature;

selecting a master object from the population of objects;

determining master emissivities of the master object at a reference temperature within the chamber from the corrected responses of each of the calibrated pyrometers;

altering the corrected pyrometer responses relative to the master emissivities to provide extreme values of emissivity from the corrected pyrometer responses to radiation at the reference temperature from within the chamber of each of a set of objects selected from said population which exhibit emissivities near extremes of the range of emissivities of objects in the population;

providing signal values determined for each of said set of objects selected from said population from the responses of the corrected pyrometers which are altered in accordance with the master emissivities;

determining a correlation between said signal values and the emissivity values of the objects providing the extreme values;

elevating another object selected from said population to a temperature within the chamber near the reference temperature;

calculating the emissivity values of said another object from the corrected responses of the pyrometers in accordance with said correlation; and altering the emissivity values of said another object within the chamber in accordance with the calculated emissivity values of said another object for determining the temperature of said another object within the chamber.

2. The method according to claim 1 wherein in the step of determining master emissivities, the determinations are performed at a plurality of reference temperatures over a selected range.

3. The method according to claim 1 wherein in the step of calculating, values of emissivity are calculated for all objects in the population thereof.

4. The method according to claim 1 wherein the objects are semiconductor wafers having similar back side coatings thereon of varying surface emissivities, and the pyrometers operate on the radiation received from the back side of a wafer within the chamber.

5. The method according to claim 1 wherein the step of determining a correlation includes establishing the difference of pyrometer responses which are altered in accordance with the master emissivities.

6. The method according to claim 1 wherein in the step of selecting, the master object is selected from the population of similar objects.

7. The method according to claim 1 wherein the step of calibrating includes correcting the responses of each pyrometer in response to detection of radiation from a wall of the processing chamber.

8. The method according to claim 1 wherein objects are thermally processed in the processing chamber at temperatures that are different from said reference temperature.

9. The method according to claim 1 for operation with more than two pyrometers which operate in different wavebands to provide signal values that are representative of radiant flux received thereby, the method comprising the step of processing the signal values in accordance with a logical combination thereof to yield indication of emissivity of the object.

* * * * *